United States Patent [19]
Hollander

[11] Patent Number: 4,815,613
[45] Date of Patent: Mar. 28, 1989

[54] ROLL-THROUGH STORAGE RACK, A GIRDER AND A RETAINING PLATE THEREFOR

[75] Inventor: Rudolf R. Hollander, Lochem, Netherlands

[73] Assignee: Nedcon B.V., Doetinchen, Netherlands

[21] Appl. No.: 68,886

[22] Filed: Jul. 1, 1987

[30] Foreign Application Priority Data

Jul. 4, 1986 [NL] Netherlands .................. 8601756

[51] Int. Cl.$^4$ ............................................. A47B 47/00
[52] U.S. Cl. .................................... 211/191; 211/59.2
[58] Field of Search .............. 211/191, 151, 153, 49.1, 211/207, 208, 59.2, 192, 182; 193/35 R; 403/232.1, 217, 219

[56] References Cited

U.S. PATENT DOCUMENTS

| | | | |
|---|---|---|---|
| 2,786,578 | 3/1957 | De Graaf et al. | 211/59.2 |
| 2,889,907 | 6/1959 | Sullivan | 211/162 X |
| 3,063,534 | 11/1962 | St. Amour | 211/59.2 X |
| 3,499,539 | 3/1970 | Fisher | 211/162 X |
| 3,900,112 | 8/1975 | Azzi et al. | 211/59.2 X |

Primary Examiner—Reinaldo P. Machado
Assistant Examiner—Sarah A. Lechok Eley
Attorney, Agent, or Firm—John P. Snyder

[57] ABSTRACT

The present invention relates to a storage rack comprising upright posts resting on a ground, girders fastened in each case between a pair of posts, the girders being fastened to the respective posts in a line such that a roller conveyor supported by the girders is inclined at a slope with respect to the ground, there is a row of perforations arranged in each pair of posts, a mounting plate joined rigidly to the girder, the plate having at least one slotted hole arranged therein, and a fastening member thrust through a perforation and through a slotted hole whereby the girder is pulled firmly against the post, and the mounting plate is provided with a first toothing that extends in a direction perpendicular to the girder and co-operates with and, owing to the fastening member, remains engaged with a second toothing.

Preferably the second toothing is arranged in a separate retaining plate, through which the fastening member passes. Further it is advantageous that the first toothing in the mounting plate is arranged in at least one long edge of the slotted holes.

15 Claims, 3 Drawing Sheets

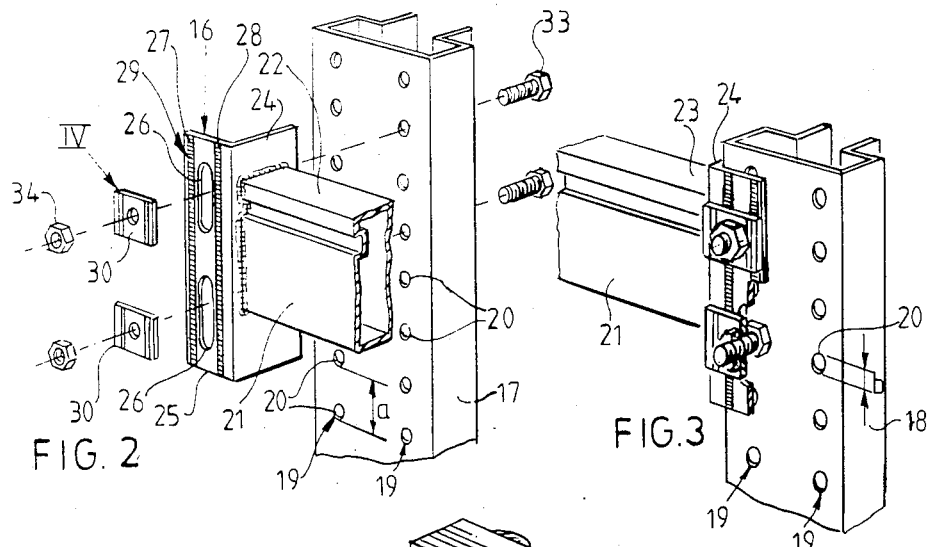
FIG. 2
FIG. 3
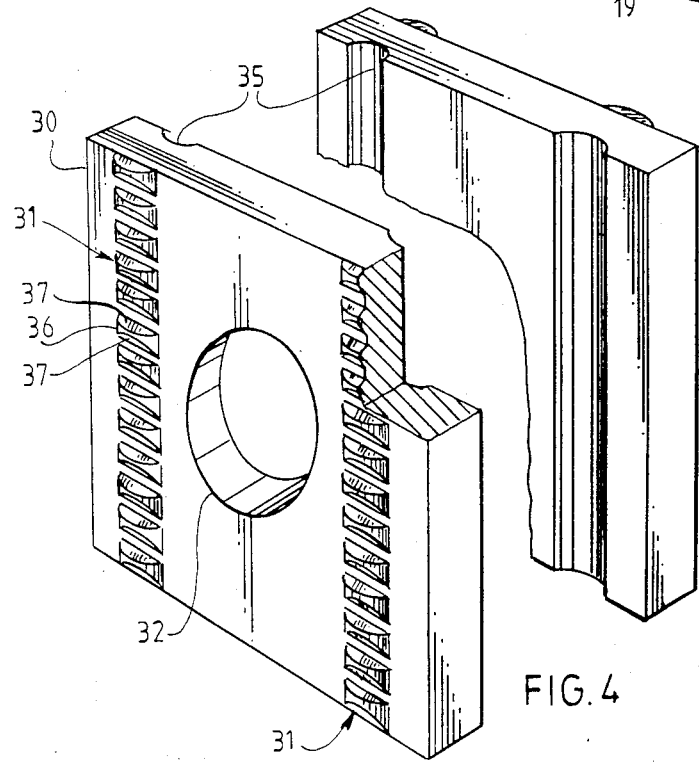
FIG. 4

ROLL-THROUGH STORAGE RACK, A GIRDER AND A RETAINING PLATE THEREFOR

This invention relates to a storage rack comprising posts resting on a ground girders fastened in each case between a pair of posts, said girders being fastened with fastening means to the respective posts in a line such that a roller conveyor supported by said girders is inclined at a slope with respect to the ground, said fastening means comprising a row of perforations arranged in each pair of posts, a mounting plate joined rigidly to the girder, said plate having at least one slotted hole arranged therein, and a fastening member thrust through a perforation and through a slotted hole whereby the girder is pulled firmly against the upright.

The storage rack must possess satisfactory stability and a bearing capacity appropriate to the goods to be handled.

The rectangular frameworks formed by the posts and the girders supporting the roller conveyor may not be braced, on account of the goods rolling through them under the influence of gravity over the roller conveyor, since this would impede the through-rolling movement.

An unbraced framework can only be stabilized by making the girder/post joint sufficiently stiff.

The stiffness behaviour of girder/post joints is described by reference to the rotational spring constant $C_v$ and the slip andle $\phi_{sl}$. The slip angle relates to the slip in the girder/post joint. The slip is the rate of increase in angular displacement at an effectively constant joint moment $M_v$ and is largely a consequence of the backlash in the joints by which the girders are fastened to the posts.

The rotational spring constant is the proportion of the joint moment $M_v$ to the angular displacement $\phi_v$, and after the initial slip angle it is constant over a certain joint moment trajectory.

The stiffness properties of the girder/post joint, together with its strength properties, determine to a great extent in particular the bearing capacity, but also the stability, of the entire storage rack. (See Richtlijnen voor ontwerp en dimensionering van industriele stalen magazijnstellingen 1, J. W. B. Stark and C. J. Tilburgs: Een bijzonder type staalkonstruktie: 'de magazijnstelling' (II), C. J. Tilburgs, both from: G. S. F.-Rictlijnen voor ontwerp en dimensionering van industriele stalen magazijnstellingen, Bedrijf & Techniek, Published by Uitgeversmij Diligentia BV, Amsterdam).

A storage rack of the type described in the preamble is known from American U.S. Pat. No. 3,877,579. The contact surfaces between the post and the mounting plate are smooth, so that a mutual displacement can only be prevented by the friction between them. A securing against mutual displacement that is based only on friction is unreliable.

The present invention has for its aim to procure a girder/post joint that combines a sufficient rotational stiffness and shear strength with a substantially stepless adjustability, without any mutual displacement being dependent on mutual friction, a quantity that varies with time and with unpredictable usage, and is thus unreliable. A stepless (re)adjustability was until now held to be substantially impossible, although of essential importance to realizing every required product-dependant slope of the roller conveyor.

In the research that underlies the invention, it has, however, become apparent that a fastening means can be constructed whereby this substantially stepless adjustability becomes possible, while a rotational stiffness and shear strength in the girder/post joint are guaranteed, such that the entire warehouse rack meets the demands placed upon it in the respects of reliability, stability and bearing capacity. According to the invention, the roll-through storage rack of the kind described in the preamble is to that end characterized in that the mounting plate is provided with a first toothing that extends in a direction perpendicular to the girder and cooperates with and, owing to the fastening member, stays engaged with a second toothing.

According to a first embodiment, the second toothing is arranged on a separate retaining plate, through which the fastening member passes. In this way, the the joint between girder and post does not depend on friction, because the retaining plate is secured against displacement with respect to the post by the fastening member which is thrust through the bore in the retaining plate.

By preference, the first toothing is arranged on the mounting plate along at least one long edge of the slotted holes, the retaining plate comprising in connection therewith two folded-over drilled-through tabs, and the second toothing is arranged along the edges of the tabs which extend along the long edges of the slotted holes. In this way, the toothing can be applied satisfactorily and cheaply from the standpoint of process engineering, because formation of the toothing requires substantially no plastic deformation, for which high pressures and specific apparatus are necessary.

In the first embodiment, the retaining plate can be enclosed between the mounting plate and the post, or can be arranged to press the mounting plate against the post.

A constructive, balanced securing is procured if the first toothing and the second toothing each possess the form of a double-track toothing, the respective slotted holes and perforations or bores being arranged between the two toothed tracks.

Finally, the invention relates to a girder and a retaining plate for a roll-through storage rack, said girder and retaining plate comprising components of the fastening means according to the invention, whereby the girder is detachable and is can be fastened steplessly adjustably in the longitudinal direction of the post to which the girder is to be fastened, without the securement against mutual displacement relying merely on mutual friction.

American U.S. Pat. No. 3,081,139 describes an electronics chassis for use in a casing. This chassis comprises vertical uprights made from two separate bars that are coupled with a fastening means whereby the girder is coupled to the uprights. The upright bars and the girders are provided with mutually co-operating toothings. Since the uprights consist of two separate bars held together by the fastening means, a chassis of this kind displays such bad buckling behaviour that it can not be used for warehouse racks.

American U.S. Pat. No. 4,496,061 relates to fastening means that are provided with grooved surfaces. These surfaces make contact, with smooth counter-surfaces of the upright and the mounting plate, and provide security against rotation. There is no question of any securing against vertical displacement.

The stated and other characteristics of the present invention will be further elucidated below in connection with a number of embodiments, by reference to the accompanying drawing.

FIG. 2 shows an exploded perspective view, on an enlarged scale, of detail II of FIG. 1;

FIG. 3 shows a perspective view, on a scale similar to FIG. 2, of detail III of FIG. 1;

FIG. 4 shows a front and rear view of detail IV of FIG. 2;

Figure 1:
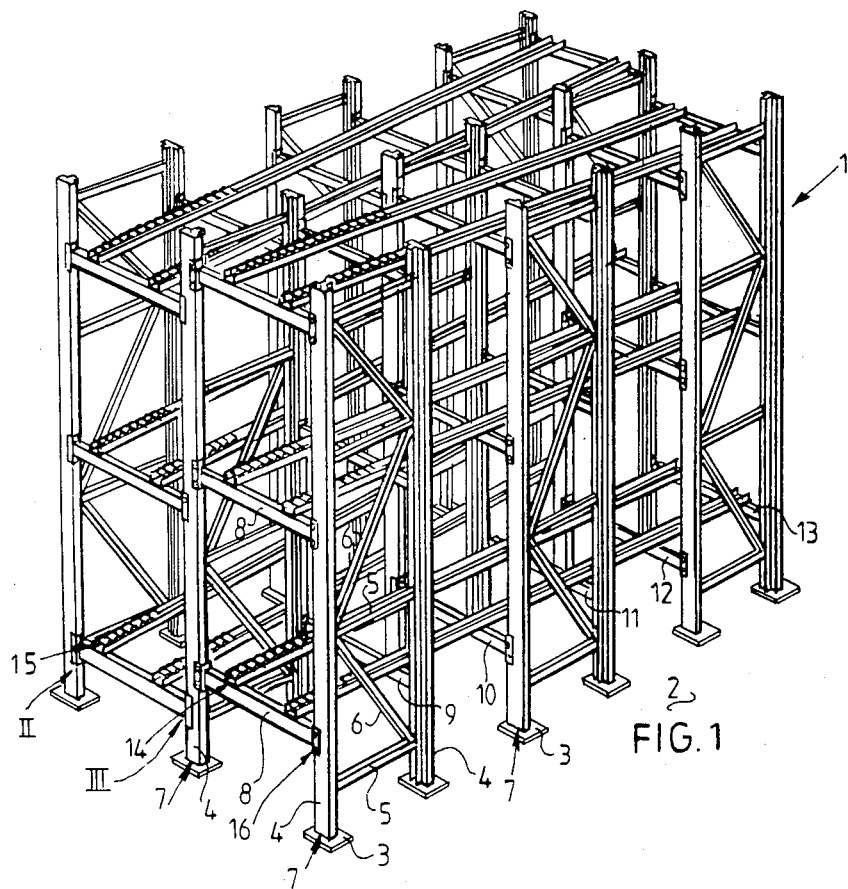
FIG. 1 shows a perspective view of a roll-through storage rack according to the invention.

FIG. 1 shows a roll-through storage rack 1. This roll-through storage rack 1 comprises posts 4 supported on a ground 2 by means of a foot-plate 3. In the transverse direction of roll-through storage rack 1, posts 4 with sills 5 and diagonal members 6 form so called trestles 7. Between trestles 7, girders 8 are each fastened between two posts 4.

In the transverse direction of roll-through storage rack 1, girders 8, 9, 10, 11, 12 and 13 form a row that is so aligned that a roller conveyor 14 supported by these girders is inclined at a slope with respect to ground 2.

Roller conveyor 14 slopes in a downward direction from girder 8 to girder 13. Roller conveyor 15, which is arranged adjacent to roller conveyor 14, slopes in the opposite direction. It should be noted that frameworks are formed by the girders and the respective posts which are not braced, in order to permit an unimpeded transport of products over roller conveyor 15. Nonetheless, the girders are detachably and, in the longitudinal direction of the respective posts, in substance steplessly adjustably attached to said posts with the aid of fastening means 16 according to the invention.

A preferred embodiment of the fastening means 16 according to the invention is illustrated in FIGS. 2 and 3.

These fastening means 16 comprise rows 19, arranged with pitch measure a in both posts 17 and 18, of perforations 20 that have height dimension b.

In the figures, circular perforations 20 are shown, but other forms of perforation are in principle possible. Girder 21 is provided at both ends 22 and 23 with an angled mounting plate 24, rigidly joined thereto by welding. Limb 25, extending parallel to girder 21, of mounting plate 24, is provided with two co-linearly arranged slotted holes 26. The slotted holes possess a height dimension h that is at least equal to the sum of pitch measure a and height dimension b. In limb 25 a first toothing 29, consisting of two tracks 27 and 28, is applied. Toothing 29 stands perpendicular to the longitudinal axis of girder 21 and is parallel to the longitudinal axis of post 17 or 18.

This first toothing cooperates with an, again, double-tracked toothing 31, applied to separate retaining plate 30, between which tracks drilling 32 is situated. With the aid of a fastening member embodied as bolt 33 and nut 34, mounting plate 34 and retaining plate 30 are pulled tightly against each other and together against posts 17. The two toothings 29 and 31 provide a reliable securing against a displacement of the post against the girder.

The assembled situation is illustrated for end 23 of girder 21 in FIG. 3.

A vertical adjustability of girder 21 in longitudinal direction of posts 17 and 18 is possible, without removal of the bolts, through a vertical distance equal to h−b. An adjustment through a greater distance is possible by moving the two bolts in the required direction to an adjacent or a further-removed perforation of the row.

Tests have shown that these fastening means 16 possess properties such that a girder fastened in this manner to posts 17 and 18 fails under a load of more than 2500 Kg., but that at the moment of failure a negligible displacement (of the order of magnitude of 0.1 mm.) has taken place in the longitudinal direction of the posts. In other words this embodiment of the fastening means satisfies the most extreme demands made for the transportation of material with the aid of roller conveyors through unbraced frameworks, while the girders are steplessly adjustable in the longitudinal direction of the posts.

This stepless adjustability is required if, for example, the rolling speed must be increased or decreased as a consequence of a change in the weight of the objects to be rolled through the storage rack.

FIG. 4 shows a greatly enlarged detail of the double-tracked toothing 31 arranged on retaining plate 30. This toothing 31 is pressed into retaining plate 30 with plastic deformation of the material, with a consequence that deformation grooves 35 occur. Teeth 36 of toothing 31 are provided with self-seeking surfaces 37. In this way the teeth of the co-operating first toothing 29 are guided into the depressions between teeth 36.

Figure 6:
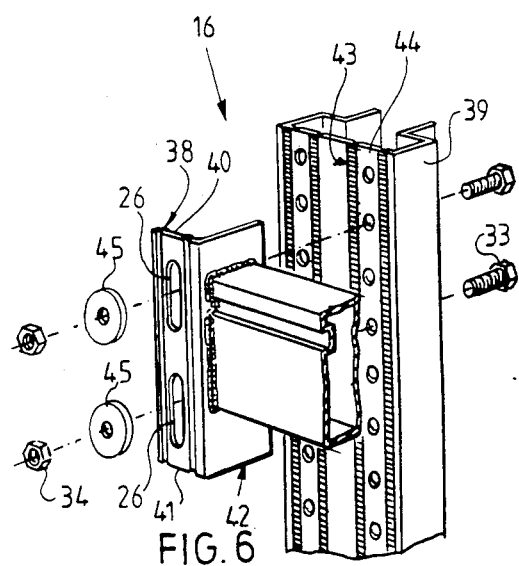
FIGS. 5 and 6 show exploded perspective views, corresponding with FIG. 2, of two other embodiments of the fastening means according to the invention.

FIG. 6 shows another embodiment of the fastening means according to the invention, wherein in comparison with FIGS. 2 and 3, the first toothing is applied to a surface 40, turned towards post 39, of limb 41 of mounting plate 42, and the therewith co-operative second toothing 43 to an post surface 44 facing toward this mounting plate surface 40. In this way a separate retaining plate 30 can be dispensed with. A disadvantage is, however, that the second toothing 43 is applied to the post, so that during manufacture of the post, generally by means of a rolling forming installation, provisions must be made to form the toothing therein. With the aid of bolt 33, cooperating nut 34 and a washer 45, mounting plate 42 is pulled tightly onto post 39.

Figure 5:
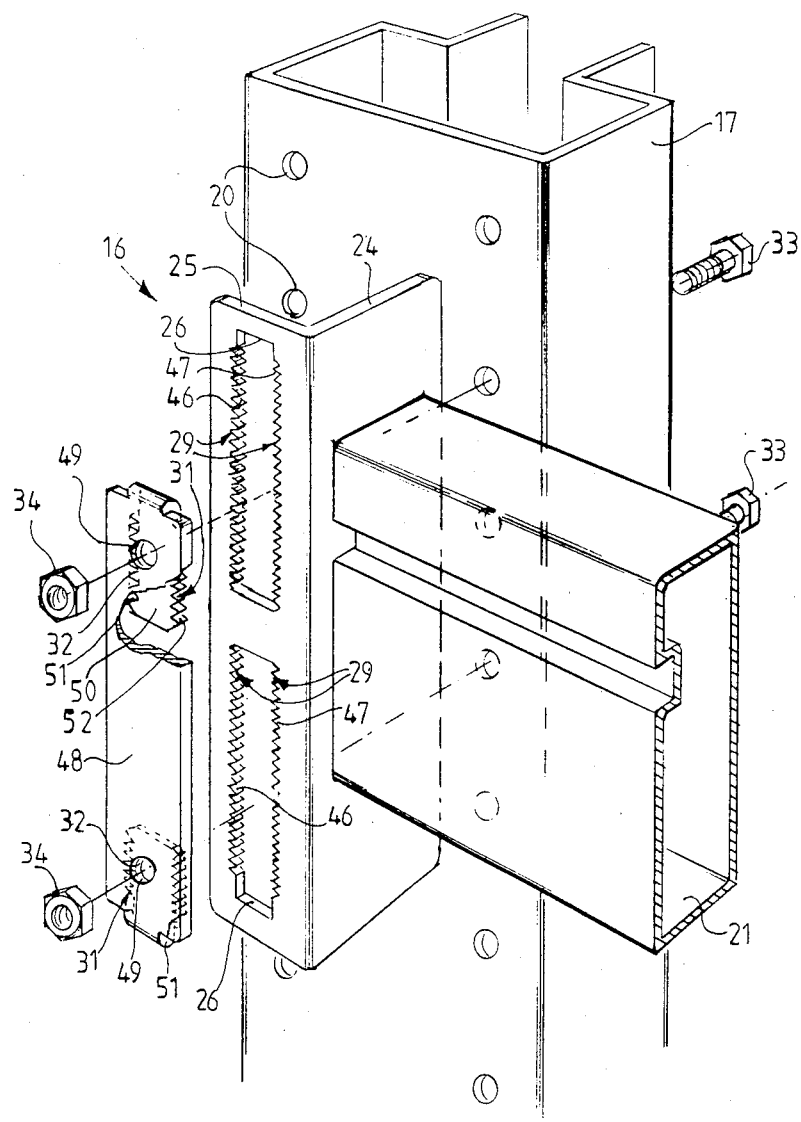

A variant of first toothing 29 and second toothing 31 shown in FIGS. 2 and 3 is shown in FIG. 5. Equivalent parts are indicated by corresponding identification numbers.

In this case, toothing 29 consists of toothings applied to the long edges 46 and 47 of slotted holes 26. Optionally, it is possible that mounting plate 24 is provided with a single, longer slotted hole 26.

The unfolded retaining plate 48 comprises two tabs 50 and 51 that are each provided with a bore 49, and are folded back in such manner that they lie against retaining plate 48 and that bores 49 coincide with bores 32 in retaining plate 48. Long edges 52 and 53 of tabs 50 and 51 are provided with the second toothing 31, that co-operates with the first toothing applied to the long edges 46 and 47 of slotted holes 26. It will be apparent that retaining plate 48 can be split up into two separate retaining plates equivalent to the already described retaining plate 30. Because the toothings are applied to the long edges of the tabs and of the slotted holes, no plastic deformation of the material is substantially necessary for the forming of these toothings, so that the manufacturing costs and the cost of the apparatus to be used are thereby lower.

In cases where the weight of the objects to be transported over the roller conveyor is relatively small, the embodiment of the fastening means 16 which is shown in FIG. 5 can be used. In this case, the use of the additional first toothing and second toothing can be dispensed with, and fastening means 16 comprise perforations 48, which are arranged in each upright with a pitch measurement a, having height dimension b, and a mounting plate 50, rigidly joined to a girder 49, which mounting plate is provided with two co-linear slotted holes 26 having a height dimension h equal to at least the sum of pitch measurement a and height dimension b, and which is pulled tightly onto girder 46 with the aid of bolts 33, nuts 34 and washers 45. In this case, too, a girder/post joint is obtained of such rotational stiffness that the entire roll-through storage rach has a sufficient stability and a loading capacity appropriate to the goods to be handled. Nonetheless, adjustability of the girders in the longitudinal direction of the posts is ensured.

I claim:

1. A storage rack comprising upright posts resting on a ground, girders fastened in each case between a pair of posts, said girders being fastened with fastening means to the respective posts in a line such that a roller conveyor supported by said girders is inclined at a slope with respect to the ground, said fastening means comprising a row of perforations arranged in each pair of posts, a mounting plate joined rigidly to the girder, said plate having at least one slotted hole arranged therein, and a fastening member thrust through a perforation and through a slotted hole whereby the girder is pulled firmly against the post, characterized in that the mounting plate is provided with a first toothing that extends in a direction perpendicular to the girder and co-operates with and, owing to the fastening member, remains engaged with a second toothing said second toothing arranged in a separate retaining plate, through which the fastener member passes.

2. A storage rack as claimed in claim 1, characterized in that the first toothing in themounting plate is arranged in at least one long edge of the slotted holes.

3. A storage rack as claimed in claim 2, characterized in that the retaining plate comprises two folded-over tabs, provided with a bore for the fastening member, and the second toothing is arranged along the edges of the tabs that extend along the long edges of the slotted holes.

4. A storage rack as claimed in claim 1, characterized in that the first toothing is arranged in the mounting plate in a surface facing away from the post, and the mounting plate is enclosed between the retaining plate and the post.

5. A storage rack as claimed in claim 1, characterized in that the first toothing is arranged in the mounting plate in a surface opposite the post, and the retaining plate is enclosed between the mounting plate and the post.

6. A storage rack as claimed in claim 1, characterized in that the second toothing is arranged in a post surface opposite the mounting plate.

7. A storage rack as claimed in claim 1, characterized in that the first toothing and the second toothing each possesses the form of a double-track toothing between which the respective slotted holes and the perforations or bores are situated.

8. A storage rack as claimed in claim 1, characterized in that the fastening member is a bolt with a cooperating nut.

9. A retaining plate for a girder for a storage rack as claimed in claim 1, comprising two folded-over tabs provided with a bore for the fastening member and a second toothing arranged along the tab edges that extend along the long edges of the slotted holes.

10. In a roller conveying system, the combination of a plurality of uprights and horizontal girders secured to and spanning between pairs of uprights and rigidly interconnecting the uprights at varying heights which define a supporting slope, roller conveying means carried by the girders on the supporting slope defined thereby at an inclination effecting travel of objects therealong, and interlocking fastening means positively and adjustably connecting the girders to their associated uprights for substantially stepless variation of the heights of the girders to control the supporting slope defined thereby and wherein the fastening means comprises a vertical row of perforations arranged in each pair of uprights, a plate having vertical slots and toothings at opposite sides of the slots, a retaining plate having an opening and second toothings at opposite sides of said opening, and a fastening member passing through the openings and slots to maintain the toothings in interengaged relation.

11. In a roller conveying system as defined in claim 10 wherein the plurality of uprights and girders are disposed in separate racks thereof, each rack being defined by four uprights and two girders with the four uprights defining two pairs thereof and individual uprights of such two pairs of uprights being rigidly interconnected by sills and trestles so that each rack is separate and movable with relation to any other rack.

12. A roller conveying system comprising the combination of:
   a plurality of trestles disposed along the length of the system, each trestle comprising a first pair of transversely aligned uprights and a second pair of transversely aligned uprights, and bracing means joining successive uprights of each trestle along the length of the system, each pair of uprights having a series of openings therein disposed in vertically spaced first steps;
   transverse girders spanning between pairs of transversely aligned uprights, and interlocking clamping means positively and adjustably clamping the girders to their associated uprights for rigidly interlocking the transversely aligned uprights of each trestle and for varying the heights of successive girders to define a supporting slope between successive pairs of girders;
   roller conveying means carried by the girders on the supporting slope defined by successive pairs of uprights at an inclination for effecting travel of objects therealong, and
   the interlocking clamping means comprising releasable clamping elements projecting through selected openings in the uprights, a first series of teeth defining vertical steps above and below the clamping elements and which are of a pitch less than that of the first steps, toothed elements each defining a second series of teeth defining vertical steps and which are of a pitch less than that of the first steps and selectively clamped against and into interdigitated engagement with teeth of the first series thereof under the action of the clamping elements, and means for vertically shifting the first and second series of teeth relative to each other for obtaining substantially stepless vertical adjustment between the girders and the uprights.

13. A roller conveying system as defined in claim 12 wherein the first series of teeth is formed on the outer sides of the uprights, the second series of teeth is formed on end elements of the girders, and the means for vertically shifting comprises elongate slots in the end elements.

14. A roller conveying system as defined in claim 12 wherein the first series of teeth is formed on the outer sides of end elements of the uprights, the second series of teeth is formed on retaining plates located by the clamping elements, and the means for vertically shifting comprises elongate slots in the end elements.

15. A roller conveying system as defined in claim 14 wherein the first series of teeth is a double row thereof in spaced opposition and the second series of teeth is a double row thereof projecting in opposite directions.

* * * * *